(12) United States Patent
Chen et al.

(10) Patent No.: US 12,451,703 B2
(45) Date of Patent: Oct. 21, 2025

(54) INTEGRATED CHARGING DEVICE, CHARGING PILE AND METHOD FOR CONTROLLING CHARGING PILE

(71) Applicant: Sungrow Power Supply Co., Ltd., Hefei (CN)

(72) Inventors: Hongchuang Chen, Hefei (CN); Luguo Wang, Hefei (CN); Linchong Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 842 days.

(21) Appl. No.: 17/706,439

(22) Filed: Mar. 28, 2022

(65) Prior Publication Data
US 2022/0337071 A1 Oct. 20, 2022

(30) Foreign Application Priority Data
Apr. 16, 2021 (CN) .......................... 202110414216.2

(51) Int. Cl.
*H02J 7/00* (2006.01)
*H02J 7/02* (2016.01)

(52) U.S. Cl.
CPC ........ *H02J 7/00036* (2020.01); *H02J 7/0013* (2013.01); *H02J 7/02* (2013.01); *H02J 2207/20* (2020.01)

(58) Field of Classification Search
USPC ....................................................... 320/132
See application file for complete search history.

(56) References Cited

U.S. PATENT DOCUMENTS

| 11,937,082 B1* | 3/2024 | Srinath Bharadwaj ...................... H04L 9/0894 |
| 2016/0039301 A1* | 2/2016 | Igarashi .................. B60L 53/66 320/157 |

(Continued)

FOREIGN PATENT DOCUMENTS

| CN | 104600791 A | 5/2015 |
| CN | 104810894 A | 7/2015 |

(Continued)

OTHER PUBLICATIONS

Extended European Search Report for European Application No. 22160510.8, dated Sep. 12, 2022.

(Continued)

*Primary Examiner* — Mohammed Alam
(74) *Attorney, Agent, or Firm* — Wolf, Greenfield & Sacks, P.C.

(57) ABSTRACT

An integrated charging device, a charging pile and a method for controlling the charging pile are provided. In the integrated charging device, a controller is communicatively connected to a first end of a communication module. A second end of the communication module includes an external communication port. The external communication port is configured to be communicatively connected to a BMS of a load via a communication line in a charging gun connected to the integrated charging device. That is, the integrated charging device is capable of communicating with the BMS, so that the controller directly communicates with the BMS, without complicated transfer by an MCU and a power control unit in the conventional technology, thereby simplifying communication in the charging pile including the integrated charging device and reducing cost.

17 Claims, 8 Drawing Sheets

(56) References Cited

U.S. PATENT DOCUMENTS

| | | | |
|---|---|---|---|
| 2018/0236888 A1 | 8/2018 | Yabuuchi et al. | |
| 2019/0196775 A1* | 6/2019 | Masuda | G06F 3/1454 |
| 2019/0344682 A1 | 11/2019 | Ge et al. | |
| 2020/0262303 A1 | 8/2020 | Dow | |
| 2020/0328604 A1* | 10/2020 | Molle | B60L 53/30 |
| 2021/0061114 A1 | 3/2021 | Sun et al. | |
| 2022/0289067 A1* | 9/2022 | Adegbohun | H01M 10/6554 |
| 2022/0337071 A1* | 10/2022 | Chen | H02J 7/0013 |
| 2022/0413833 A1* | 12/2022 | Kodama | G06F 13/00 |
| 2022/0415097 A1* | 12/2022 | Kodama | G06F 13/00 |

FOREIGN PATENT DOCUMENTS

| | | |
|---|---|---|
| CN | 106143198 A | 11/2016 |
| CN | 207328190 U | 5/2018 |
| CN | 207766012 U | 8/2018 |
| CN | 108928252 A | 12/2018 |
| CN | 111071095 A | 4/2020 |
| CN | 211809139 U | 10/2020 |
| CN | 112224081 A | 1/2021 |
| EP | 3 264 560 A1 | 1/2018 |
| EP | 3 560 749 A1 | 10/2019 |
| KR | 10-2020-0099935 A | 8/2020 |
| WO | WO 2016/134658 A1 | 9/2016 |

OTHER PUBLICATIONS

Second Office Action for Chinese Application No. 202110414216.2, dated Jul. 15, 2022.

* cited by examiner

INTEGRATED CHARGING DEVICE, CHARGING PILE AND METHOD FOR CONTROLLING CHARGING PILE

The present application claims priority to Chinese Patent Application No. 202110414216.2, titled "INTEGRATED CHARGING DEVICE, CHARGING PILE AND METHOD FOR CONTROLLING CHARGING PILE", filed on Apr. 16, 2021 with the China National Intellectual Property Administration, which is incorporated herein by reference in its entirety.

FIELD

The present disclosure relates to the technical field of charging piles, and in particular to an integrated charging device, a charging pile and a method for controlling the charging pile.

BACKGROUND

At present, a charging pile includes multiple charging devices. Both power control and charging control are performed on the charging pile. That is, a power control unit in the charging pile transmits a power request from a load to a corresponding charging device, and the charging device controls its own output, so as to perform charging by a single charging device or by multiple charging devices connected in parallel, thereby meeting power demand of the load.

In order to perform the above control, internal communication in the existing charging pile includes three levels: a micro control unit (MCU), the power control unit, and a controller in each of the multiple charging devices, where the MCU performs communication between a battery management system (BMS) of the load and the power control unit, and the power control unit communicates with the controller in each of the multiple charging devices, resulting in complicated communication in the existing charging pile and high cost.

SUMMARY

In view of the above disadvantages in the conventional technology, an integrated charging device, a charging pile and a method for controlling the charging pile are provided according to the present disclosure, so as to solve the problems of complicated communication in the charging pile and high cost in the conventional technology.

In order to solve the above problems, the following technical solutions are provided according to embodiments of the present disclosure.

In a first aspect of the present disclosure, an integrated charging device is provided, which includes a main circuit, a controller, and a communication module.

An input terminal of the main circuit serves as a power input terminal of the integrated charging device, and a first output terminal of the main circuit serves as a power output terminal of the integrated charging device, and is configured to be connected to a power input terminal of a charging gun corresponding to the integrated charging device.

The controller is configured to control the main circuit to operate.

A first end of the communication module is communicatively connected to the controller, and a second end of the communication module includes an external communication port, where the external communication port is configured to be communicatively connected to a BMS of a load via a communication line in the charging gun.

In an embodiment, the second end of the communication module further includes: an internal communication port configured to be connected to a module communication bus to perform internal communication within a charging pile in which the integrated charging device is arranged.

In an embodiment, the communication module is configured to communicate with the BMS based on a controller area network (CAN) bus protocol; and/or the module communication bus is a CAN bus.

In an embodiment, the main circuit further includes: a second output terminal serving as an auxiliary power output terminal of the integrated charging device and configured to supply power to the BMS via an auxiliary power line in the charging gun.

In an embodiment, an output voltage of the second output terminal is within a preset range.

In an embodiment, the main circuit includes: an AC/DC converter, a first DC/DC converter, and a second DC/DC converter.

An alternating current side of the AC/DC converter serves as the input terminal of the main circuit.

A direct current side of the AC/DC converter, an input terminal of the first DC/DC converter, and an input terminal of the second DC/DC converter are connected to a direct current bus of the main circuit.

An output terminal of the first DC/DC converter serves as the first output terminal of the main circuit.

An output terminal of the second DC/DC converter serves as the second output terminal of the main circuit.

In a first aspect of the present disclosure, a charging pile is provided, which includes a main controller, N charging guns, and at least N integrated charging devices, where each of the at least N integrated charging devices is the integrated charging device described in any one of the above embodiments, and N is a positive integer.

Power input terminals of the at least N integrated charging devices are connected in parallel.

Each of the N charging guns is connected to at least one of the at least N integrated charging devices.

The main controller is communicatively connected to an internal communication port of each of the at least N integrated charging devices.

In an embodiment, the number of integrated charging devices is N, and the N integrated charging devices are connected to the N charging guns in a one-to-one correspondence.

In an embodiment, the charging pile further includes at least N power charging devices.

Power input terminals of the at least N power charging devices and the power input terminals of the N integrated charging devices are connected in parallel.

The power output terminal of each of the N integrated charging devices is connected in parallel to a power output terminal of at least one of the at least N power charging devices.

Each of the at least N power charging devices is provided with an internal communication port configured to be communicatively connected to each of the integrated charging devices.

In an embodiment, in a case that N is greater than 1, the charging pile further includes a switch module.

The switch module configured to connect the power output terminal of one of the integrated charging devices in parallel to the power output terminal of another one of the integrated charging devices.

In an embodiment, the charging pile further includes: a module communication bus configured to be communicatively connected to the main controller, an internal communication port of each of the power charging devices and the internal communication port of each of the integrated charging devices.

In a third aspect of the present disclosure, a method for controlling a charging pile is provided. The method is applicable to the charging pile according to any one of the above embodiments, and includes:

transmitting, by the main controller in the charging pile in response to a command for starting a first charging gun among the N charging guns, a primary group operation command to a first integrated charging device that is among the integrated charging devices and that is connected to the first charging gun;

communicating, by the first integrated charging device, with a BMS of a load connected to the first charging gun via a communication line in the first charging gun, to acquire a power request from the BMS; and charging, by the first integrated charging device, the load via the first charging gun.

In an embodiment, in a case that the first integrated charging device includes an auxiliary power output terminal, the method further includes: before the communicating, by the first integrated charging device, with a BMS of a load connected to the first charging gun via a communication line in the first charging gun, supplying, by the first integrated charging device, power to the BMS via an auxiliary power line in the first charging gun.

In an embodiment, in a case that the charging pile includes at least N power charging devices, the method further includes: when the main controller transmits the primary group operation command to the first integrated charging device corresponding to the first charging gun, transmitting, by the main controller, a slave command subordinate to the first integrated charging device to a first power charging device that is among the at least N power charging devices and that is connected in parallel to the power output terminal of the first integrated charging device; and after the communicating, by the first integrated charging device, with a BMS of a load connected to the first charging gun via a communication line in the first charging gun, to acquire a power request from the BMS, the method further includes:

forwarding, by the first integrated charging device, the power request; and receiving, by the first power charging device, the power request forwarded by the first integrated charging device, and activating, in a case that power outputted by the first integrated charging device does not meet power demand in the power request, the first power charging device to output power, where the first power charging device serves as a supplementary power supply to share the power demand in the power request.

In an embodiment, in a case that the charging pile further includes a switch module, the method further includes: after the receiving, by the first power charging device, the power request forwarded by the first integrated charging device, and activating, in a case that power outputted by the first integrated charging device does not meet power demand in the power request, the first power charging device to output power, and in a case that a sum of power outputted by both the first integrated charging device and the first power charging device does not meet the power demand, performing following operations at least once until the power demand in the power request is met:

transmitting, by the main controller, a secondary group preparation command to a second integrated charging device that is among the integrated charging devices and that is idle and a second power charging device that is among the at least N power charging devices and that is connected in parallel to the power output terminal of the second integrated charging device;

controlling, by the main controller when the second integrated charging device meets a preset condition, the switch module to act, to connect the second integrated charging device in parallel to the first integrated charging device to output power; and determining the second power charging device connected in parallel to the power output terminal of the second integrated charging device as a supplementary power supply for the second integrated charging device.

In an embodiment, the method for controlling a charging pile further includes: after the transmitting, by the main controller, a secondary group preparation command to a second integrated charging device that is among the integrated charging devices and that is idle and a second power charging device that is among the at least N power charging devices and that is connected in parallel to the power output terminal of the second integrated charging device, automatically acquiring, by the second integrated charging device, an output voltage of the first integrated charging device based on a primary group number of the first integrated charging device transmitted by the main controller; and adjusting, by the second integrated charging device, a voltage outputted by the second integrated charging device based on the output voltage of the first integrated charging device, where the preset condition includes that the voltage outputted by the second integrated charging device is equal to the output voltage of the first integrated charging device.

In an embodiment, the method for controlling a charging pile further includes: after the second integrated charging device is connected in parallel to the first integrated charging device to output power, controlling, by the main controller in response to a command for starting a second charging gun that is currently idle and that is connected to the second integrated charging device, the switch module to act to disconnect the second integrated charging device from the first integrated charging device currently connected to the second integrated charging device in parallel; and transmitting, by the main controller, the primary group operation command to the second integrated charging device, to cause the second idle integrated charging device and the second power charging device connected in parallel to the power output terminal of the second integrated charging device to stop outputting power;

communicating, by the second integrated charging device, with a BMS of a load connected to the second charging gun via a communication line in the second charging gun, to acquire a power request from the BMS;

charging, by the second integrated charging device, the load via the second charging gun; and determining the second power charging device connected in parallel to the power output terminal of the second integrated charging device as a supplementary power supply for the second integrated charging device.

In an embodiment, in a case that the charging pile includes a module communication bus, the forwarding, by the first integrated charging device, the power request includes:

forwarding, by the first integrated charging device, the power request to the module communication bus.

In the above integrated charging device according to the present disclosure, the controller is communicatively connected to the first end of the communication module. The second end of the communication module includes the external communication port. The external communication port is configured to be communicatively connected to a BMS of a load via the communication line in the charging gun connected to the integrated charging device. That is, the integrated charging device is capable of communicating with the BMS, so that the controller directly communicates with the BMS, eliminating the complicated transfer process by the MCU and the power control unit in the conventional technology, thereby simplifying communication in the charging pile provided with the integrated charging device and reducing cost.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be acquired by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments acquired by those skilled in the art based on the embodiments of the present disclosure without any creative work fall within the protection scope of the present disclosure.

In the present disclosure, terms such as "include", "comprise" or any other variants are intended to be non-exclusive. Therefore, a process, method, article or device including a series of elements includes not only these elements but also other elements that are not enumerated, or also include elements inherent for the process, method, article or device. Unless expressively limited otherwise, a statement of "comprising (including) one . . . " does not exclude a case that other similar elements exist in the process, method, article or device.

An integrated charging device is provided according to the present disclosure, to solve the problems of complicated communication in the charging pile and high cost in the conventional technology.

Figure 1:
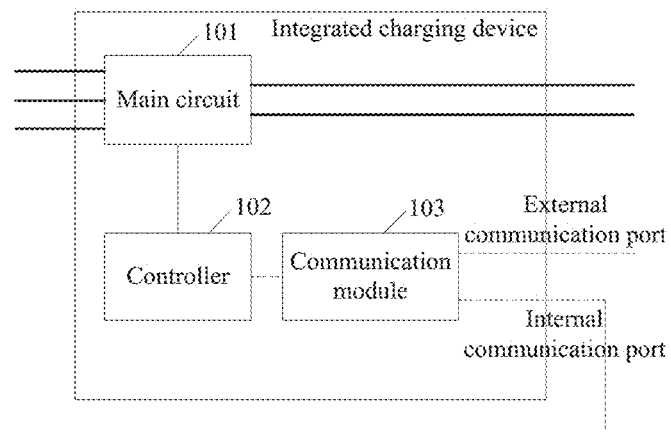
FIG. 1 is a schematic structural diagram showing an integrated charging device according to an embodiment of the present disclosure.

Referring to FIG. 1, the integrated charging device includes a main circuit 101, a controller 102, and a communication module 103.

An input terminal of the main circuit 101 serves as a power input terminal of the integrated charging device, and is configured to be connected to a grid input module to receive inputted alternating current power. A power transmission cable for the input terminal of the main circuit 101 is shown as the thick solid line on the left side of the main circuit in FIG. 1.

A first output terminal of the main circuit 101 serves as a power output terminal of the integrated charging device, and is configured to be connected to a power input terminal of a charging gun corresponding to the integrated charging device to output direct current power so as to charge a load, for example, a high-voltage power battery of an electric vehicle. A power transmission cable for the first output terminal of the main circuit 101 is shown as the thick solid line on the right side of the main circuit 101 in FIG. 1.

The controller 102 is configured to control operation of the main circuit 101. The controller 102 controls the main circuit to convert alternating current into direct current (AC to DC) based on a determined parameter, so as to charge the load. A control cable for the controller 102 is shown as the thin solid line in FIG. 1.

A first end of the communication module 103 is communicatively connected to the controller 102. A second end of the communication module 103 includes an external communication port. The external communication port is configured to be communicatively connected to a BMS of the load via a communication line in the charging gun. A communication cable for the communication module 103 is shown as the dotted line in FIG. 1.

In the integrated charging device according to this embodiment, the controller 102 is communicatively connected with a BMS of a load via the communication module 103. That is, the integrated charging device is capable of communicating with the BMS, so that the controller 102 directly communicates with the BMS, eliminating the complicated transfer process by the MCU and the power control unit in the conventional technology, thereby simplifying communication in the charging pile provided with the integrated charging device and reducing cost, and improving integration of the charging device.

In an embodiment, the communication module 103 communicates with the BMS based on a CAN bus protocol. Alternatively, the communication module 103 communicates with the BMS based on another protocol. The CAN bus protocol only serves as an example for description. A protocol for communication between the communication module 103 and the BMS is not limited to the CAN bus protocol and depends on application scenarios. All technical solutions that the communication module 103 communicates with the BMS based on a protocol fall within the protection scope of the present disclosure.

In practice, multiple charging devices are arranged in a charging pile. These charging devices may include the integrated charging device according to this embodiment, the existing charging device in the conventional technology, or both the integrated charging device and existing charging device. Each of the multiple charging devices is required to communicate with a main controller in the charging pile. Further, the multiple charging devices may communicate with each other to share information. In an embodiment, the second end of the communication module 103 further includes an internal communication port. The internal communication port is configured to be connected to a module communication bus, so as to perform communication in the charging pile where the integrated charging device is arranged.

That is, in the charging pile, each charging device, which may be an integrated charging device or an existing charging device, is connected to the module communication bus through an internal communication port of the charging device, the main controller in the charging pile is also connected to the module communication bus, to perform communication in the charging pile.

In practice, the module communication bus may be a CAN bus or a bus following another protocol, which may be any protocol in the conventional technology. The CAN bus only serves as an example for description. The module communication bus is not limited to the CAN bus and depends on application scenarios, and all suitable module communication buses fall within the protection scope of the present disclosure.

It should be noted that in the conventional technology, a current charging pile is required to be compatible with both a charging scheme of 12V and a charging scheme of 24V due to a power supply scheme of 24V for a power source in the early national standard for charging. Therefore, two switching power sources of respective voltage levels are required in the charging pile, which increases complexity of a charging system.

In order to solve a problem of high cost in auxiliary power supply, based on the above embodiments, an integrated charging device is provided according to another embodiment of the present disclosure. The main circuit 101 in the integrated charging device further includes: a second output terminal. The second output terminal serves as an auxiliary power output terminal of the integrated charging device, and is configured to at least supply power to a BMS through an auxiliary power line in the charging gun. In practice, since the charging device is capable of power conversion, a voltage outputted from the second output terminal of the charging device is adjustable within a preset range, for example, a range of [12V, 24V]. In this way, the charging pile is compatible with both the charging scheme of 12V and the charging scheme of 24V.

Figure 2:
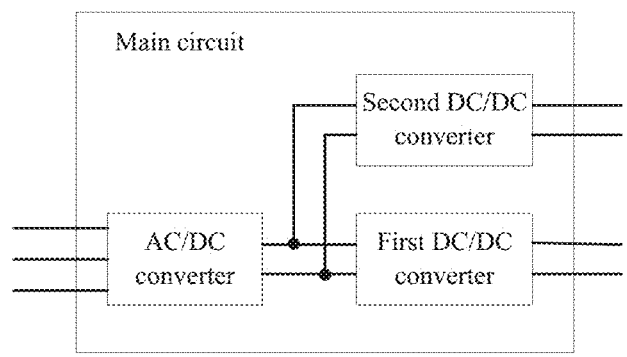
FIG. 2 is a schematic structural diagram showing a main circuit in the integrated charging device according to an embodiment of the present disclosure.

In practice, as shown in FIG. 2, the main circuit 101 includes an AC/DC converter, a first DC/DC converter, and a second DC/DC converter.

An alternating current side of the AC/DC converter serves as the input terminal of the main circuit 101, and is configured to receive inputted alternating current power. A direct current side of the AC/DC converter, an input terminal of the first DC/DC converter, and an input terminal of the second DC/DC converter are connected to a direct current bus of the main circuit 101, so that direct current power outputted by the AC/DC converter is inputted to the first DC/DC converter and the second DC/DC converter through the direct current bus.

An output terminal of the first DC/DC converter serves as the first output terminal of the main circuit 101, to supply direct current power to the load.

An output terminal of the second DC/DC converter serves as the second output terminal of the main circuit 101, to supply power to the BMS of the load, so as to perform auxiliary power supply.

In an embodiment, each of the first and second DC/DC converters is an isolated DC/DC converter, to improve charging safety.

That is, the integrated charging device according to this embodiment not only includes the external communication port for communicating with the BMS, but also integrates an auxiliary power supply for supplying power to the BMS. Therefore, a BMS auxiliary power supply in the conventional technology is unnecessary, simplifying wiring in the charging pile. Further, when the charging pile is on standby, the integrated charging device is powered off, reducing the power consumption of the charging pile on standby, thereby reducing operation cost. Moreover, the integrated charging device is capable of outputting adjustable direct current power through DC/DC conversion, resulting in low cost and a sample structure.

Figure 3:
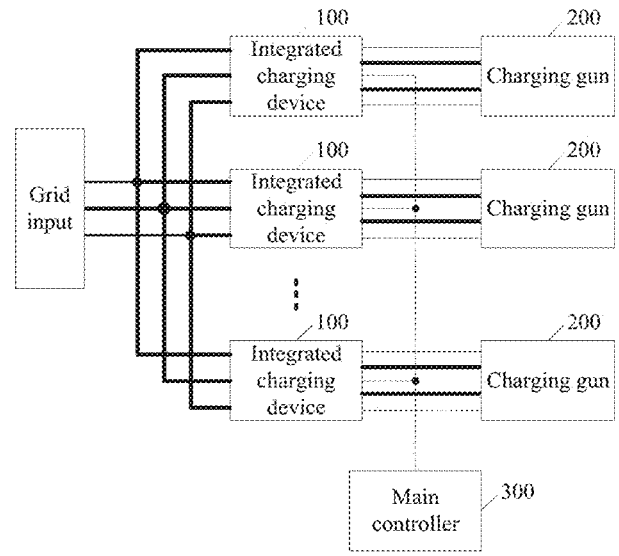
FIG. 3 is a schematic structural diagram showing a charging pile according to an embodiment of the present disclosure.

A charging pile is provided according to another embodiment of the present disclosure. As shown in FIG. 3, the charging pile includes a main controller 300, N charging guns 200, and N integrated charging devices 100 as described in any of the above embodiments, where N is a positive integer.

Power input terminals of the N integrated charging devices 100 are connected in parallel, and are configured to receive inputted alternating current power via a grid input component. The grid input component may include devices such as a protector and a contactor. Details of the grid input link can be referred to the conventional technology, and are not described herein.

Each of the N charging guns 200 is provided with at least one integrated charging device 100. In an embodiment, the number of integrated charging devices 100 is N, and the N integrated charging devices 100 are connected to the N charging guns 200 in one-to-one correspondence. Based on the above embodiments, for each of the N integrated charging devices 100, a connection cable between the integrated charging device 100 and a charging gun 200 that is among the N charging guns 200 and that corresponds to the integrated charging device 100 includes: a power transmission cable for supplying direct current power to a load (shown as the thick solid line between the integrated charging device 100 and the charging gun 200 in FIG. 3), an auxiliary power cable for supplying power to a BMS of a load (shown as the thin solid line between the integrated charging device 100 and the charging gun 200 in FIG. 3), and a communication cable to be communicatively connected with the BMS of the load (shown as the dashed line between the integrated charging device 100 and the charging gun 200 in FIG. 3). Therefore, each of the N integrated charging devices 100 is capable of independently charging a load via the charging gun 200 corresponding to the integrated charging device 100, supplying power to a BMS of the load, and communicating with the BMS of the load.

The main controller 300 is communicatively connected to the internal communication port of each of the N integrated charging devices 100 through a communication cable, which is shown as the dotted line between each integrated charging device 100 and the main controller 300 and in FIG. 3.

In an embodiment, the main controller 300 and the internal communication port of each of the N integrated charging devices 100 are connected to a module communication bus, to perform communication in the charging pile via the module communication bus.

In practice, the charging pile may include only the integrated charging device according to the above embodiments, and the number of the integrated charging device is not limited. Alternatively, the charging pile may include both the integrated charging device according to the above embodiments and an existing charging device shown as a power charging device 400 in FIG. 4. The power charging device 400 is capable of only outputting direct current power and performing internal communication, and cannot supply power to a BMS and perform external communication such as communication with the BMS. When power required by a charging gun 200 exceeds the power supply capacity of the integrated charging device 100 corresponding to the charging gun 200, the power charging device 400 is connected in parallel to the integrated charging device 100 to increase power for charging and reduce duration for charging the load. In addition, it should be noted that power supply to a BMS of a load connected to the charging gun 200 and communication with the BMS can be implemented by equipping each charging gun 200 with one integrated charging device 100, so as to ensure charging at least cost. In practice, a charging gun 200 may be provided with two or more integrated charging devices 100, all of which fall within the protection scope of the present disclosure.

Figure 4:
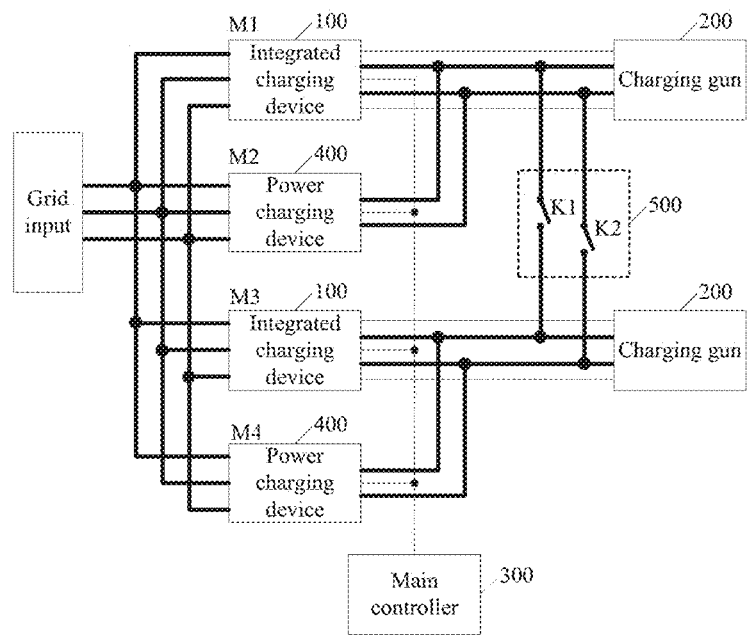
FIG. 4 is a schematic structural diagram showing a charging pile according to another embodiment of the present disclosure.

In an embodiment, the charging pile further includes at least N power charging devices 400, as shown in FIG. 4. That is, each integrated charging devices 100 is equipped with at least one power charging device 400, so as to meet demand for high-power charging.

Power input terminals of the at least N power charging devices 400 and the power input terminals of the N integrated charging devices 100 are connected in parallel, and are connected to the grid input component. The power output terminal of each of the N integrated charging devices 100 is connected in parallel to a power output terminal of at least one of the N power charging device 400. In addition, each of the at least N power charging devices 400 includes an internal communication port that is communicatively connected with each of the N integrated charging devices 100. In an embodiment, the internal communication port of each of the N power charging devices 400 is communicatively connected to the module communication bus, so as to be connected to the main controller 300 and the internal communication port of each of the N integrated charging devices 100. Therefore, information is shared between any modules in the charging devices.

FIG. 4 only shows an example in which a charging pile includes two integrated charging devices 100 and each of the two integrated charging devices 100 is provided with one power charging device 400. In practice, the charging pile may include multiple integrated charging device 100, and each integrated charging device 100 may be provided with any number of power charging devices 400. The number of the integrated charging device 100 and the number of the power charging device 400 depend on application scenarios, all of which are within the protection scope of the present disclosure.

In an embodiment, only one integrated charging device 100 is arranged in a charging circuit of a charging gun in the charging pile. The power charging device connected in parallel to the power output terminal of the integrated charging device 100 may be a common charging device, that is, the power charging device 400 that is incapable of supplying power to a BMS and communicate with the BMS, so as to reduce system cost.

It should be noted that power required by a load connected to the charging gun 200 may not be satisfied by the integrated charging device 100 and the power charging device 400 corresponding to the charging gun 200. A solution that each charging gun 200 is provided with multiple power charging devices 400 to meet large power demand may result in high cost of the charging pile. In view of this, in an embodiment, the charging pile further includes a switch module 500 in a case that N is greater than 1, as shown in FIG. 4.

For each of the N integrated charging devices 100, the power output terminal of the integrated charging device 100 may be connected in parallel to the power output terminal of another one of the N integrated charging devices 100 via the switch module 500. In a case that a sum of power supplied by both the integrated charging device 100 and the power charging device 400 that correspond to a charging gun 200 cannot meet power demand of a load connected to the charging gun 200, the power output terminal of another charging device is connected in parallel to the power input terminal of the charging gun 200 via the switch module 500, so as to meet the power demand of the load in real time.

Figure 5:
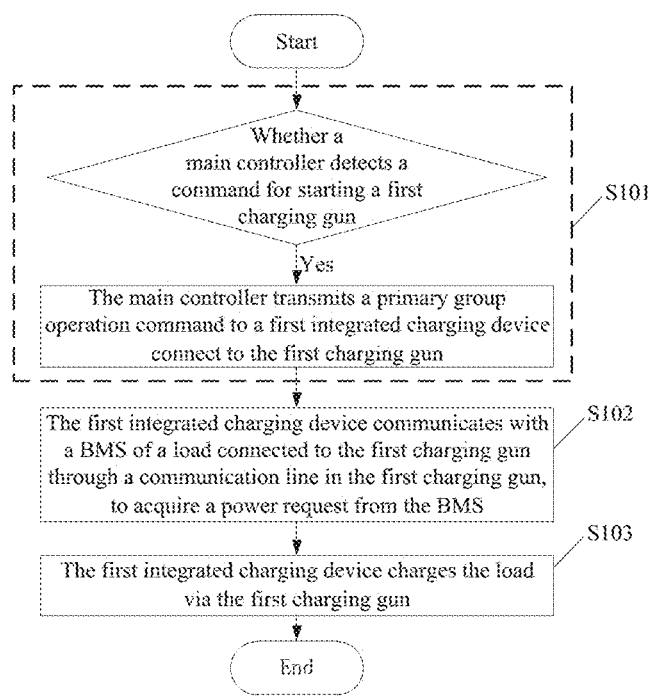
FIGS. 5 to 7 are each a flowchart showing a method for controlling a charging pile according to an embodiment of the present disclosure.

Based on the above embodiments, a method for controlling a charging pile is provided according to another embodiment of the present disclosure. The method is applicable to the charging pile according to the above embodiments. Referring to FIG. 5, the method includes the following steps S101 to S103.

In step S101, the main controller in the charging pile transmits, in response to a command for starting a first charging gun among the N charging guns, a primary group operation command to a first integrated charging device that is among the integrated charging devices and that is connected to the first charging gun.

Referring to the above embodiments, a power input terminal of each of the charging guns in the charging pile is connected to one of the integrated charging devices. When any one of the charging guns in the charging pile is connected to a load, the main controller receives a command for starting the charging gun. In this case, the integrated charging device connected to the charging gun is to be started to supply power for charging the load.

In step S102, the first integrated charging device communicates with a BMS of a load connected to the first charging gun through a communication line in the first charging gun, to acquire a power request from the BMS.

Amount of power required by the load is determined before charging the load. Since the integrated charging device is capable of communicating with a BMS, the integrated charging device directly communicates with the BMS of the load to acquire the power request, so as to determine the amount of power required by the load.

In step S103, the first integrated charging device charges the load via the first charging gun.

After the amount of power required by the load is determined, the first integrated charging device charges the load based on power demand of the load. For power conversion during charging, reference can be made to the above embodiments and the conventional technology, which is not described in detail herein.

Figure 6:
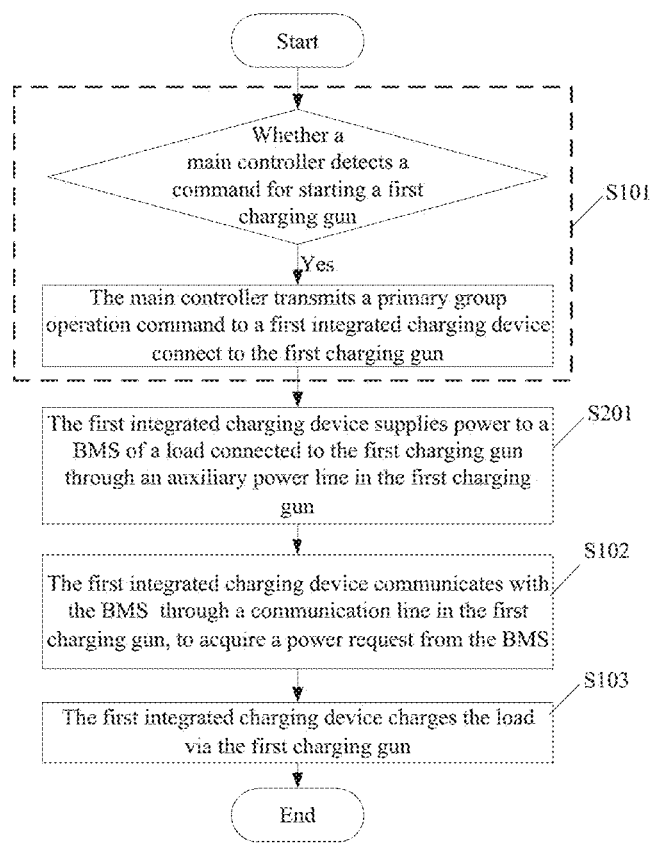

In practice, before step S102, that is, before the first integrated charging device communicates with the BMS of the load connected to the first charging gun via the communication line in the first charging gun, the first integrated charging device is required to supply power to the BMS to start the BMS. The conventional charging pile is provided with a separate BMS auxiliary power supply to supply power to the BMS. In an embodiment, in a case that the first integrated charging device includes the auxiliary power output terminal, the method further includes a step S201 before step S102, as shown in FIG. 6.

In step S201, the first integrated charging device supplies power to the BMS through an auxiliary power line in the first charging gun.

The integrated charging device is capable of supplying power to the BMS. Before communicating with the BMS, the integrated charging device supplies power to the BMS to start the BMS, so as to perform parameter monitoring and communication, thereby eliminating the BMS auxiliary power supply in the conventional technology, and simplifying the system structure.

With the method according to this embodiment, the process of power request by the BMS according to the conventional technology is eliminated. The integrated charging device can automatically adjust the output power according to the power request, to charge a load without participation of the main controller 300.

Figure 7:
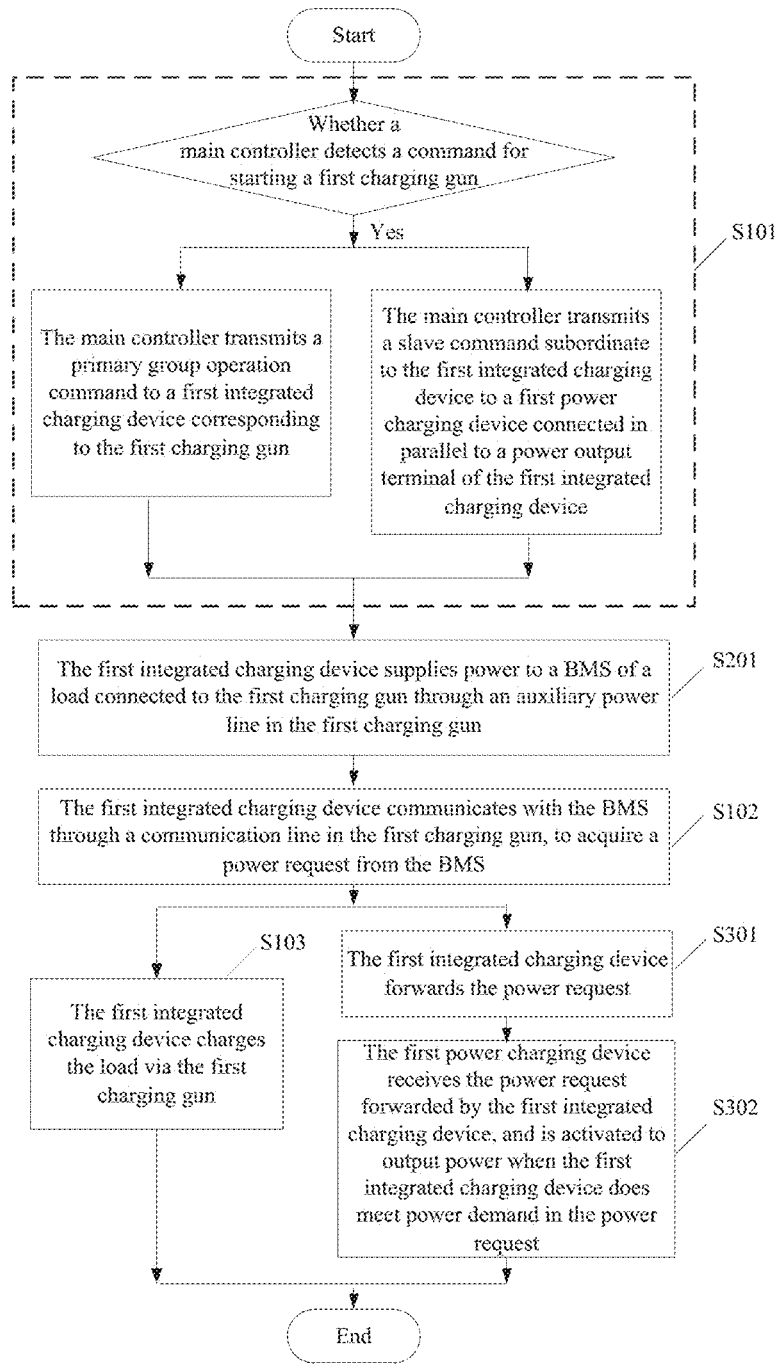

Based on the previous embodiment, in a case that the charging pile includes at least N power charging devices, the method further includes a step as shown in FIG. 7 (for example, based on FIG. 6). In this step, when the main controller transmits the primary group operation command to the first integrated charging device corresponding to the first charging gun in step S101, the main controller transmits a slave command subordinate to the first integrated charging device to a first power charging device that is among the N power charging devices and that is connected in parallel to the power output terminal of the first integrated charging device.

Further, after step S102, that is, after the first integrated charging device communicates with the BMS of the load connected to the first charging gun via the communication line in the first charging gun to acquire the power request from the BMS, the method further includes the following steps S301 to S302 as shown in FIG. 7.

In step S301, the first integrated charging device forwards the power request.

In a case that the charging pile includes the module communication bus, in step S301, the first integrated charging device forwards the power request to the module communication bus, so that all devices in the charging pile acquire the power request for further processes.

In step S302, the first power charging device connected in parallel to the power output terminal of the first integrated charging device receives the power request forwarded by the first integrated charging device. When the first integrated charging device does not meet power demand in the power request, the first power charging device is activated to output power, as a supplementary power supply to share the power demand in the power request.

The power input terminal of each charging gun is connected to one of the integrated charging devices and at least one of the power charging devices. When the power charging device acquires the power request via the module communication bus and determines that the power of the integrated charging device is insufficient for charging the load, the power charging device outputs power to equally share the power demand of the load with the integrated charging device. In this case, the integrated charging device and the power charging device form a primary group for charging the load. Further, the power charging device automatically adjusts its output power according to the power request, so as to charge the load without participation of the main controller 300.

Figure 8:
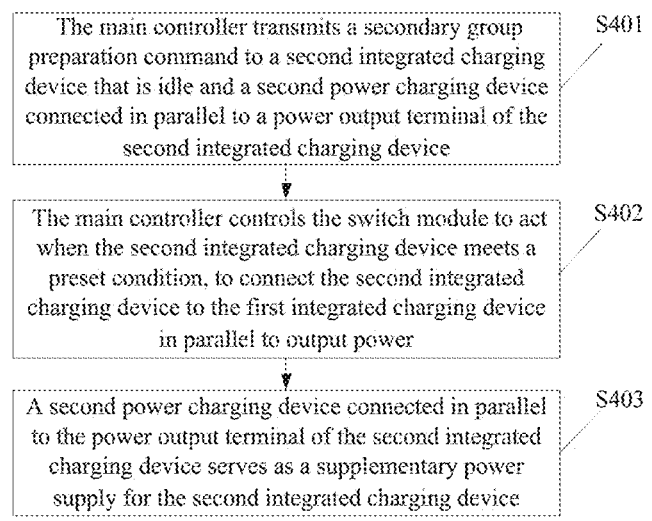
FIGS. 8 to 10 are each a flowchart showing a part of a method for controlling a charging pile according to an embodiment of the present disclosure.

Based on the above embodiment, in a case that the charging pile further includes a switch module, after step S302, that is, after the first power charging device acquires the power request forwarded by the first integrated charging device and the first power charging device is activated to output power when the first integrated charging device does not meet the power demand in the power request, the method further includes the following steps S401 to S403 as shown in FIG. 8 in a case that a sum of power outputted by both the first integrated charging device and the first power charging device does not meet the power demand in the power request. Steps S401 to S403 are performed at least once until the power demand in the power request is met.

In step S401, the main controller transmits a secondary group preparation command to a second integrated charging device that is among the integrated charging devices other than the first integrated charging device and that is idle and a second power charging device that is among the N power charging devices and that is connected in parallel to the power output terminal of the second integrated charging device.

In step S402, the main controller controls the switch module to act when the second integrated charging device meets a preset condition, to connect the second integrated charging device to the first integrated charging device in parallel to output power.

In step S403, the second power charging device connected in parallel to the power output terminal of the second integrated charging device serves as a supplementary power supply for the second integrated charging device.

Figure 9:
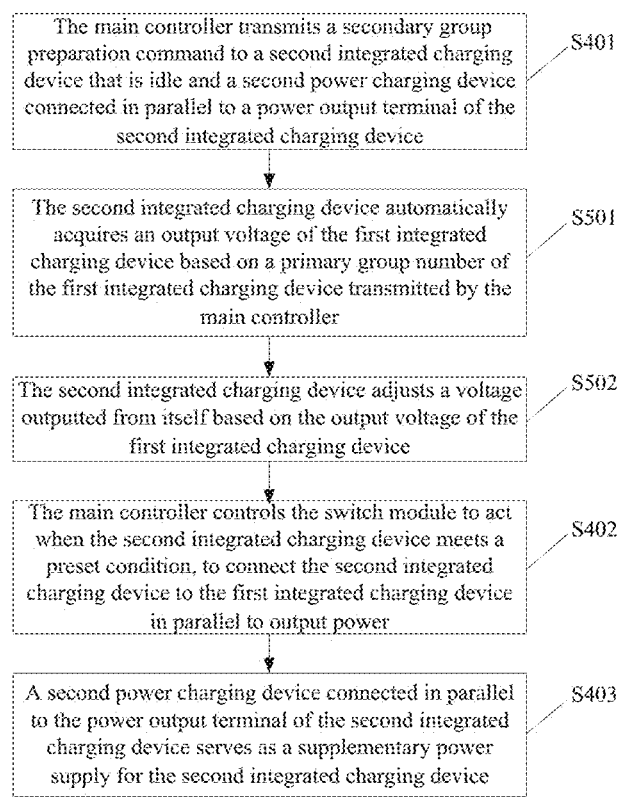

In an embodiment, in addition to steps S401 to S403 included in the method that are performed at least once as shown in FIG. 8, the method further includes the following steps S501 to S502 after step S401, that is, after the main controller transmits the secondary group preparation command to the second integrated charging device and the second power charging device connected in parallel to the power output terminal of the second integrated charging device, as shown in FIG. 9.

In step S501, the second integrated charging device automatically acquires an output voltage of the first integrated charging device based on a primary group number of the first integrated charging device transmitted by the main controller.

In step S502, the second integrated charging device adjusts a voltage outputted from itself based on the output voltage of the first integrated charging device.

The preset condition includes that the voltage outputted by the second integrated charging device is equal to the output voltage of the first integrated charging device.

In practice, after the first integrated charging device transmits the power request to the module communication bus, it is unnecessary for the main controller to operate if the power demand is met due to participation of the first power charging device connected in parallel to the power output terminal of the first integrated charging device. Otherwise, the main controller is required to dispatch another integrated charging device that is idle, that is, the second integrated charging device. The power outputted by the primary group that is insufficient for the power demand is supplemented with additional power via the switch module, so that the power demand of the load is met. Further, in order to schedule the second integrated charging device that is idle, the main controller transmits the secondary group preparation command and the primary group number to the module communication bus. The second integrated charging device acquires, based on the primary group number, an object to which the second integrated charging device is to be connected in parallel, and acquires the output voltage of the primary group via the module communication bus and adjusts the voltage outputted from itself to be the same as the output voltage of the primary group. When detecting that the voltage outputted by the second integrated charging device is equal to the output voltage of the primary group, the main controller controls, by controlling the switch module, the second integrated charging device to be connected in parallel to the primary group, so that the second integrated charging device and the primary group both output power to charge the load. When being connected in parallel to the primary group to output power, the second integrated charging device neither supplies power to the BMS of the load nor communicates with the BMS. The power charging device connected in parallel to the power output terminal of the second integrated charging device serves as a supplementary power supply for the second integrated charging device, and forms a secondary group together with the second integrated charging device. For operation of the power charging device in the secondary group, reference can be made to the operation of the first power charging device in the primary group, which is not described in detail here.

Figure 10:
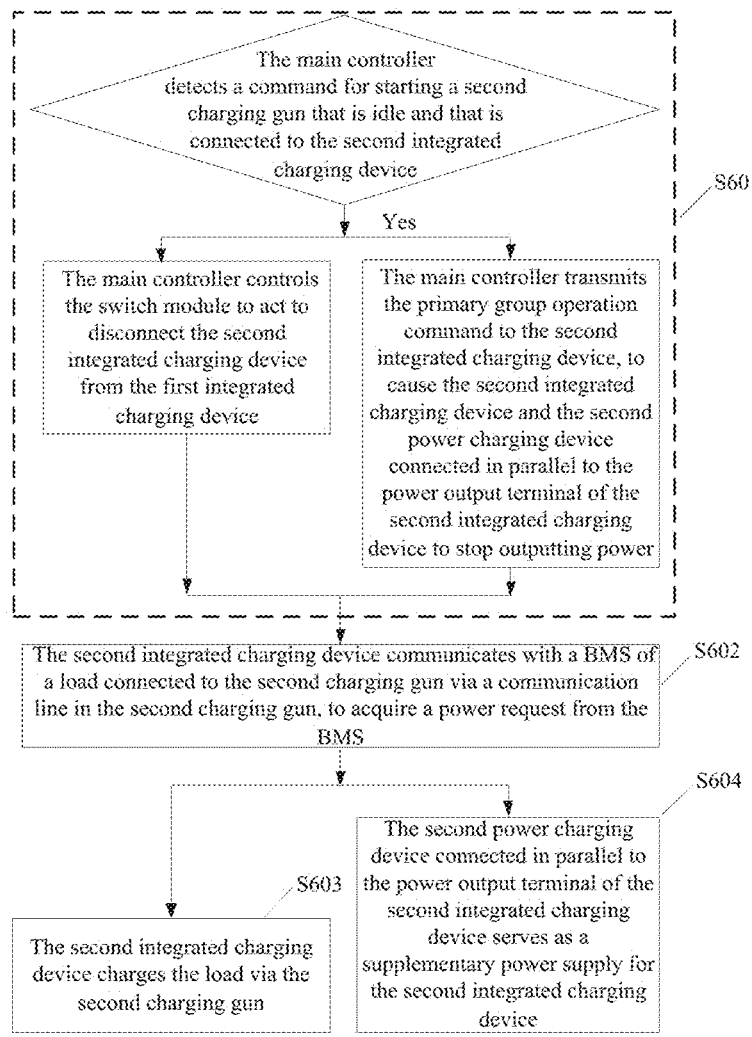

In an embodiment, after step S402, that is, after the second integrated charging device is connected in parallel to the first integrated charging device to output power, the method further includes the following steps S601 to S604 as shown in FIG. 10.

In step S601, in response to a command for starting a second charging gun that is currently idle and that is connected to the second integrated charging device, the main controller controls the switch module to act so as to disconnect the second integrated charging device from the first integrated charging device currently connected to the second integrated charging device in parallel; and transmits the primary group operation command to the second integrated charging device, to cause the second integrated charging device and the second power charging device connected in parallel to the power output terminal of the second integrated charging device to stop outputting power.

In step S602, the second integrated charging device communicates with a BMS of a load connected to the second charging gun via the communication line in the second charging gun, to acquire a power request from the BMS.

In step S603, the second integrated charging device charges the load via the second charging gun.

In step S604, the second power charging device connected in parallel to the power output terminal of the second integrated charging device serves as a supplementary power supply for the second integrated charging device.

When the second integrated charging device and the power charging device corresponding to the second integrated charging device serve as the secondary group and supply power to the charging gun corresponding to the primary group, the second charging gun corresponding to the second integrated charging device may be connected to another load. In this case, the second integrated charging device and the power charging device corresponding to the second integrated charging device are required to be switched from the secondary group for another charging gun to the primary group for the charging gun corresponding to the second integrated charging device and the power charging device corresponding to the second integrated charging device. In order to switch from the secondary group to the primary group, the second integrated charging device stops outputting power first, is cut off by the switch module from another integrated charging device to which the idle integrated charging device is currently connected in parallel, and then supplies power to and communicates with a BMS of the load connected to the second charging gun corresponding to the second integrated charging device. That is, another round of process starts from step S201. Moreover, after the second integrated charging device and the power charging device corresponding to the second integrated charging device are switched from the secondary group to the primary group, steps shown in FIG. 8 or FIG. 9 may be performed at least once if the power outputted by the second integrated charging device and the power charging device corresponding to the second integrated charging device is insufficient to charge the load, so as to meet power demand of the load.

A standard 60 kW dual-gun charging pile is taken as an example, of which the internal structure is as shown in FIG. 4. Each of M1 and M3 represents the integrated charging device 100 capable of supplying power to a BMS and communicating with the BMS. Each of M2 and M4 represents a conventional charging device, that is, the power charging device 400. The output terminal of the integrated charging device 100 represented by M1 and the output terminal of the power charging device 400 represented by M2 are connected in parallel to form a group 1. The output terminal of the integrated charging device 100 represented by M3 and the output terminal of the power charging device 400 represented by M4 are connected in parallel to form a group 2. The standard 60 kW dual-gun charging pile is controlled as follows.

In response to a command for starting a charging gun 200, for example, the charging gun 200 corresponding to M1, the main controller 300 directly transmits the primary group operation command to M1, and transmits the slave command subordinate to M1 to M2, to activate the primary group, which is the group 1 formed by M1 and M2. A charging device to be connected in parallel to the primary group to output power serves as a secondary group. Unlike the integrated charging device 100 in the primary group, the integrated charging device 100 in the secondary group does not supply power to the BMS when connected in parallel to the primary group to output direct current power.

When successfully communicating with the BMS and outputting power, M1 transmits a power request received from the BMS to a module communication bus. The power request includes power amount requested by the BMS. If a charging device in the charging pile other than M1 determines that the currently requested power is less than the power outputted by one charging device, the charging device automatically determines that only M1 needs to operate. In this case, only M1 outputs power to respond to the power request.

In a case that the power requested by the BMS is greater than the power outputted by one charging device and less than power outputted by two charging devices, M2 automatically participates in power output and share a half of the power requested by the BMS, without participation of the main controller 300.

In a case that the power requested by the BMS is greater than the power outputted by two charging devices and less than power outputted by three charging devices, the main controller 300 transmits the secondary group preparation command and the primary group number corresponding to the primary group to M3 and M4. M3 automatically acquires the output voltage of the primary group and adjusts a voltage outputted from itself to be equal to the output voltage. When detecting that the voltage outputted by the secondary group is equal to the output voltage of the primary group, the main controller 300 controls contactors K1 and K2 in the switch module 500 to connect the secondary group in parallel to the primary group. A process for connecting M4 in parallel with M3 is similar to that for M2. When the charging device is connected, each charging device acquires output states and group information of all charging devices through communication in the charging pile, and automatically adjusts a voltage and a current outputted from itself based on the group information of itself.

In a case that group 2 serving as the secondary group is connected to group 1 that serves as the primary group, when the charging gun 200 corresponding to M3 is to output power, the main controller 300 controls the contactors K1 and K2 to be switched off and transmits the primary group operation command to group 2, to cause group 2 to operate as the primary group. In response to the primary group operation command, M3 and M4 both stop outputting, and M3 supplies power to the BMS of the charging gun corresponding to M3, and communicates with the BMS, and outputs direct current power to respond to a power request from this BMS.

The embodiments in this specification are described in a progressive manner. The same or similar parts between embodiments can be referred to each other, and each embodiment focuses on differences from other embodiments. Since the system or system embodiment is similar to the method embodiment, the description of the system is relatively simple, and for related parts, reference can be made to the description of the method embodiment. The system and system embodiment described above are merely illustrative. The units described as separate components may or may not be physically separate from each other. A component described as a unit may or may not be a physical unit, that is, may be located at one place or may be distributed on multiple network units. Some or all of the modules may be selected to implement the technical solutions in the embodiments, depending on actual needs. Those skilled in the art can understand and implement the technical solutions without creative work.

Those skilled in the art should further understand that the units and algorithm steps described in examples in combination with the embodiments according to the present disclosure can be implemented by electronic hardware, computer software, or a combination of electronic hardware and computer software. In order to clearly illustrate the interchangeability of hardware and software, details and steps in each example are described in terms of functions in the above description. Whether these functions are implemented by hardware or software depends on actual applications of the technical solutions and design constraints. Those skilled in the art may implement the described functions in a way varying with actual applications, all of which should fall within the scope of the present disclosure.

Based on the above description of the disclosed embodiments, the features described in the embodiments in this specification may be replaced or combined, so that those skilled in the art can implement or use the present disclosure. Those skilled in the art can easily think of various modifications to the disclosed embodiments, and the general principles defined herein may be implemented in other embodiments without departing from the spirit or scope of the present disclosure. Therefore, the present disclosure should not be limited to the described embodiments, but conforms to the widest scope that complies with the principles and novelty disclosed herein.

The invention claimed is:

1. An integrated charging device, comprising a main circuit, a controller, and a communication module, wherein an input terminal of the main circuit serves as a power input terminal of the integrated charging device, and a first output terminal of the main circuit serves as a power output terminal of the integrated charging device, and is configured to be connected to a power input terminal of a charging gun corresponding to the integrated charging device;

the controller is configured to control the main circuit to operate; and a first end of the communication module is communicatively connected to the controller, and a second end of the communication module comprises an external communication port, wherein the external communication port is configured to be communicatively connected to a battery management system, BMS, of a load via a communication line in the charging gun;

wherein the integrated charging device is applied to a charging pile, the charging pile comprises a main controller, N charging guns, and at least N integrated charging devices, and N is a positive integer, wherein each of the N charging guns is connected to at least one of the at least N integrated charging devices; and the main controller is communicatively connected to an internal communication port of each of the at least N integrated charging devices.

2. The integrated charging device according to claim 1, wherein the second end of the communication module further comprises:

an internal communication port configured to be connected to a module communication bus to perform internal communication within a charging pile in which the integrated charging device is arranged.

3. The integrated charging device according to claim 2, wherein the communication module is configured to communicate with the BMS based on a controller area network, CAN, bus protocol; and/or the module communication bus is a CAN bus.

4. The integrated charging device according to claim 1, wherein the main circuit further comprises:

a second output terminal serving as an auxiliary power output terminal of the integrated charging device and configured to supply power to the BMS via an auxiliary power line in the charging gun.

5. The integrated charging device according to claim 4, wherein an output voltage of the second output terminal is within a preset range.

6. The integrated charging device according to claim 5, wherein the main circuit comprises: an AC/DC converter, a first DC/DC converter, and a second DC/DC converter, wherein an alternating current side of the AC/DC converter serves as the input terminal of the main circuit, a direct current side of the AC/DC converter, an input terminal of the first DC/DC converter, and an input terminal of the second DC/DC converter are connected to a direct current bus of the main circuit, an output terminal of the first DC/DC converter serves as the first output terminal of the main circuit, and an output terminal of the second DC/DC converter serves as the second output terminal of the main circuit.

7. The charging pile according to claim 1, wherein the number of integrated charging devices is N, and the N integrated charging devices are connected to the N charging guns in a one-to-one correspondence.

8. The charging pile according to claim 7, further comprising at least N power charging devices, wherein power input terminals of the at least N power charging devices and the power input terminals of the N integrated charging devices are connected in parallel; and the power output terminal of each of the N integrated charging devices is connected in parallel to a power output terminal of at least one of the at least N power charging devices; and each of the at least N power charging devices is provided with an internal communication port configured to be communicatively connected to each of the integrated charging devices.

9. The charging pile according to claim 8, wherein in a case that N is greater than 1, the charging pile further comprises:

a switch module configured to connect the power output terminal of one of the integrated charging devices in parallel to the power output terminal of another one of the integrated charging devices.

10. The charging pile according to claim 1, further comprising:

a module communication bus configured to be communicatively connected to the main controller, an internal communication port of each of the power charging devices and the internal communication port of each of the integrated charging devices.

11. A method for controlling a charging pile, wherein the method is applicable to the charging pile according to claim 1, and comprises:

transmitting, by the main controller in the charging pile in response to a command for starting a first charging gun among the N charging guns, a primary group operation command to a first integrated charging device that is among the integrated charging devices and that is connected to the first charging gun;

communicating, by the first integrated charging device, with a battery management system, BMS, of a load connected to the first charging gun via a communication line in the first charging gun, to acquire a power request from the BMS; and charging, by the first integrated charging device, the load via the first charging gun.

12. The method for controlling a charging pile according to claim 11, wherein in a case that the first integrated charging device comprises an auxiliary power output terminal, before the communicating, by the first integrated charging device, with a BMS of a load connected to the first charging gun via a communication line in the first charging gun, the method further comprises:

supplying, by the first integrated charging device, power to the BMS via an auxiliary power line in the first charging gun.

13. The method for controlling a charging pile according to claim 11, wherein in a case that the charging pile comprises at least N power charging devices, the method further comprises:

when the main controller transmits the primary group operation command to the first integrated charging device corresponding to the first charging gun, transmitting, by the main controller, a slave command subordinate to the first integrated charging device to a first power charging device that is among the at least N power charging devices and that is connected in parallel to the power output terminal of the first integrated charging device; and after the communicating, by the first integrated charging device, with a BMS of a load connected to the first charging gun via a communication line in the first charging gun, to acquire a power request from the BMS, the method further comprises:

forwarding, by the first integrated charging device, the power request; and receiving, by the first power charging device, the power request forwarded by the first integrated charging device, and activating, in a case that power outputted by the first integrated charging device does not meet power demand in the power request, the first power charging device to output power, wherein the first power charging device serves as a supplementary power supply to share the power demand in the power request.

14. The method for controlling a charging pile according to claim 13, wherein in a case that the charging pile further comprises a switch module, the method further comprises:

after the receiving, by the first power charging device, the power request forwarded by the first integrated charging device, and activating, in a case that power outputted by the first integrated charging device does not meet power demand in the power request, the first power charging device to output power, and in a case that a sum of power outputted by both the first integrated charging device and the first power charging device does not meet the power demand, performing following operations at least once until the power demand in the power request is met:

transmitting, by the main controller, a secondary group preparation command to a second integrated charging device that is among the integrated charging devices and that is idle and a second power charging device that is among the at least N power charging devices and that is connected in parallel to the power output terminal of the second integrated charging device;

controlling, by the main controller when the second integrated charging device meets a preset condition, the switch module to act, to connect the second integrated charging device in parallel to the first integrated charging device to output power; and determining the second power charging device connected in parallel to the power output terminal of the second integrated charging device as a supplementary power supply for the second integrated charging device.

15. The method for controlling a charging pile according to claim 14, further comprising: after the transmitting, by the main controller, a secondary group preparation command to a second integrated charging device that is among the integrated charging devices and that is idle and a second power charging device that is among the at least N power charging devices and that is connected in parallel to the power output terminal of the second integrated charging device, automatically acquiring, by the second integrated charging device, an output voltage of the first integrated charging device based on a primary group number of the first integrated charging device transmitted by the main controller; and adjusting, by the second integrated charging device, a voltage outputted by the second integrated charging device based on the output voltage of the first integrated charging device, wherein the preset condition comprises that the voltage outputted by the second integrated charging device is equal to the output voltage of the first integrated charging device.

16. The method for controlling a charging pile according to claim 14, further comprising: after the second integrated charging device is connected in parallel to the first integrated charging device to output power,
  controlling, by the main controller in response to a command for starting a second charging gun that is currently idle and that is connected to the second integrated charging device, the switch module to act to disconnect the second integrated charging device from the first integrated charging device currently connected to the second integrated charging device in parallel; and
  transmitting, by the main controller, the primary group operation command to the second integrated charging device, to cause the second integrated charging device and the second power charging device connected in parallel to the power output terminal of the second integrated charging device to stop outputting power;
  communicating, by the second integrated charging device, with a BMS of a load connected to the second charging gun via a communication line in the second charging gun, to acquire a power request from the BMS;
  charging, by the second integrated charging device, the load via the second charging gun; and
  determining the second power charging device connected in parallel to the power output terminal of the second integrated charging device as a supplementary power supply for the second integrated charging device.

17. The method for controlling a charging pile according to claim 14, wherein in a case that the charging pile comprises a module communication bus, the forwarding, by the first integrated charging device, the power request comprises:
  forwarding, by the first integrated charging device, the power request to the module communication bus.

* * * * *